(12) United States Patent
Sherry (10) Patent No.: US 10,036,347 B1
(45) Date of Patent: Jul. 31, 2018

(54) STANDBY ENERGY GENERATING SYSTEM

(71) Applicant: Raymond C. Sherry, Cleburne, TX (US)

(72) Inventor: Raymond C. Sherry, Cleburne, TX (US)

( * ) Notice: Subject to any disclaimer, the term of this patent is extended or adjusted under 35 U.S.C. 154(b) by 943 days.

(21) Appl. No.: 14/336,238

(22) Filed: Jul. 21, 2014

Related U.S. Application Data

(60) Provisional application No. 61/958,082, filed on Jul. 19, 2013.

(51) Int. Cl.
*F02G 5/04* (2006.01)
*H02K 7/18* (2006.01)

(52) U.S. Cl.
CPC .............. *F02G 5/04* (2013.01); *H02K 7/1815* (2013.01); *F02G 2280/20* (2013.01)

(58) Field of Classification Search
CPC ...... F02G 5/04; F02G 2280/20; H02K 7/1815
USPC ................ 237/12.1, 13, 19; 60/320
See application file for complete search history.

(56) References Cited

U.S. PATENT DOCUMENTS

| 4,432,336 | A | * | 2/1984 | Black | F23C 3/00 |
| | | | | | 126/39 J |
| 4,857,755 | A | * | 8/1989 | Comstock | H02J 9/08 |
| | | | | | 307/47 |
| 7,305,840 | B2 | * | 12/2007 | Kang | F24F 3/1423 |
| | | | | | 62/238.7 |
| 7,401,578 | B2 | * | 7/2008 | Otterstrom | F02B 47/02 |
| | | | | | 123/3 |
| 7,600,695 | B2 | * | 10/2009 | Kang | F25B 27/00 |
| | | | | | 237/12.1 |
| 8,097,128 | B1 | | 1/2012 | Sherry | |
| 8,136,740 | B2 | * | 3/2012 | Hagen | F01K 21/047 |
| | | | | | 237/12 |
| 8,245,948 | B2 | * | 8/2012 | Cho | F25B 27/02 |
| | | | | | 122/1 R |
| 8,286,423 | B2 | * | 10/2012 | Yuri | F02G 5/00 |
| | | | | | 237/12.1 |
| 8,372,248 | B1 | | 2/2013 | Sherry | |
| 8,631,657 | B2 | * | 1/2014 | Hagen | B60H 1/032 |
| | | | | | 237/12.1 |
| 2004/0055300 | A1 | * | 3/2004 | Lawheed | F01C 1/123 |
| | | | | | 60/641.8 |
| 2004/0086816 | A1 | | 5/2004 | Hays et al. | |
| 2004/0124638 | A1 | * | 7/2004 | van de Loo | B60L 11/1816 |
| | | | | | 290/40 C |

(Continued)

FOREIGN PATENT DOCUMENTS

| EP | 1744109 | A2 | * | 1/2007 | ............. | F25B 13/00 |
| EP | 1744110 | A2 | * | 1/2007 | ............. | F25B 13/00 |

(Continued)

*Primary Examiner* — Gregory Huson
*Assistant Examiner* — Daniel E Namay
(74) *Attorney, Agent, or Firm* — Roger N. Chauza, PC (57) ABSTRACT

An energy generating system for generating thermal energy and electrical energy for a premises. The system includes an engine that drives an AC power generator to supply supplemental or standby power to the premises. The thermal energy given off by the engine is also coupled to the premises to provide heat thereto. A processor controls the various parameters of both the energy generating system and the premises to coordinate the proper heating and cooling thereof.

13 Claims, 4 Drawing Sheets

(56) References Cited

U.S. PATENT DOCUMENTS

| | | | |
|---|---|---|---|
| 2004/0238654 A1* | 12/2004 | Hagen | F01K 21/047 237/12.1 |
| 2005/0098643 A1* | 5/2005 | Guyer | F24D 5/02 237/12.1 |
| 2005/0161521 A1* | 7/2005 | Guyer | F24D 5/02 237/12.1 |
| 2006/0123823 A1* | 6/2006 | Ha | F02G 5/00 62/238.7 |
| 2006/0283967 A1* | 12/2006 | Cho | F24F 3/1423 237/12.1 |
| 2007/0012418 A1* | 1/2007 | Cho | F25B 13/00 165/58 |
| 2007/0018009 A1* | 1/2007 | Choi | F24F 11/0086 237/12 |
| 2008/0022707 A1* | 1/2008 | Cho | F25B 13/00 62/238.1 |
| 2008/0022708 A1* | 1/2008 | Cho | F25B 13/00 62/238.7 |
| 2008/0023961 A1* | 1/2008 | Cho | F25B 27/02 290/2 |
| 2009/0107128 A1* | 4/2009 | Yuri | F02G 5/00 60/320 |
| 2009/0107129 A1* | 4/2009 | Yuri | F02G 5/00 60/320 |
| 2009/0127868 A1* | 5/2009 | Yuri | F01N 5/02 290/40 R |
| 2010/0294585 A1* | 11/2010 | Wolff | H02K 5/24 180/298 |
| 2013/0219894 A1* | 8/2013 | Bannister | F01K 17/02 60/671 |

FOREIGN PATENT DOCUMENTS

| | | | | |
|---|---|---|---|---|
| EP | 1882890 A2 | * | 1/2008 | ............ F25B 13/00 |
| EP | 1882891 A2 | * | 1/2008 | ............ F25B 13/00 |
| JP | 2006307857 A | * | 11/2006 | ............ F25B 13/00 |

* cited by examiner

STANDBY ENERGY GENERATING SYSTEM

RELATED APPLICATIONS

This non-provisional patent application claims the benefit of U.S. Provisional Application No. 61/958,082, filed Jul. 19, 2013.

TECHNICAL FIELD OF THE INVENTION

The present invention relates in general to auxiliary electrical generators, and more particularly to engine-driven generators that deliver electricity as well as heat to a building.

BACKGROUND OF THE INVENTION

Many auxiliary electrical generators function as standby units to provide AC power when the power from the utility AC grid is interrupted. The standby generators are often equipped with sensors that sense the absence of AC power from the grid and are started to thereby provide supplemental AC power to the home, office, building or other facility. Many facilities that provide necessary services have standby generators so that such services can continue to be provided. Hospitals and telecommunication providers are examples where the use of standby generators are utilized. Many standby generators are powered by engines that use gasoline or diesel as a fuel. It is not economical to use diesel or gasoline-powered engines to drive generators as the cost of operation due to maintenance and fuel far exceeds the cost of electricity obtained from utility providers.

The acceptance of standby generators relates to the emergency need for electricity, rather than the cost effectiveness of such equipment. In other words, in many situations, the need for electrical power overrides any concern for the cost of providing power in emergency situations. Even at the homeowner level, the cost of electricity delivered by standby means is less important than the comfort provided by the supplemental electricity when the power grid is unable to provide the same. But, the continued supply of AC power to a home when the grid fails, or during a brownout, is a function of the ability of the homeowner to pay for the standby equipment, and is not related to efficiency or cost payback. Accordingly, the luxury of having heat and cooling in a home during a power grid outage is available to those few who can easily afford the standby equipment.

The utilization of engine-driven generators by homeowners is not widespread as the initial cost of such equipment is significant, it requires periodic maintenance even if not used, and the fuel is not stable over long periods of time. When alcohol is added to gasoline by refineries, the alcohol tends to absorb moisture which can cause mechanical as well as operational problems with the engine. It is well known that gasoline deteriorates after six months or so and must be replaced so as to maintain the critical components thereof. The lubricating oil of the standby engine must be replaced periodically, not because the use thereof breaks down the lubricating properties, but because the time of non-use deteriorates the lubricating properties as well as allows the oil to be exposed to environmental moisture.

The efficiency of a gasoline or diesel-powered generator is compromised because such type of engine is at best 30% efficient. The efficiency is low because an internal combustion engine generates substantial heat that is dissipated to the air. The dissipation of heat from an engine is essential to the service life of the engine. A supplemental dissipation of engine heat is through the oil which circulates through the engine, and back to the oil reservoir where it is cooled somewhat. Some engines are specially equipped with oil coolers, which are like water radiators, that allow air to circulate through a separate radiator to cool the oil.

An additional shortcoming of the widespread use of standby generators is the engineering of the same for different individuals or businesses. While standby generators are widely available, they are not easily tailored to specific or specialized applications. In addition, while one can easily purchase a standby AC power unit, there is often a lack of experienced personnel who know how to modify the power delivery equipment of a home or business to make an orderly transition from the power grid to the standby unit easy and as transparent as possible. The normal person who is interested in a standby power unit does not know how many kilowatts of AC power is necessary either during normal use, or during periods of surge currents such as when large AC power-using equipment starts to operate. The proper engineering of the correct size of a standby unit must take into consideration surge capabilities as well as average power used under normal circumstances.

The acceptance of standby AC power generators by more consumers can be facilitated by making the standby units more efficient so that the initial investment is not only recovered, but recovered in a short period of time. When a standby power unit is powered by natural gas or propane gas, the cost effectiveness is enhanced, and such type of fuel does not deteriorate over time, thus eliminating the need to change out the fuel supply every year or so. Moreover, the cost of natural gas is much lower than the corresponding cost of either gasoline or diesel. When the cost of the standby unit is amortized over a period of time, together with the lower cost of fuel, and with the production of thermal energy to heat a house or business, standby units can be much more attractive and cost effective to ordinary persons. In addition to the foregoing, when AC power is available from the power grid, but thermal energy is needed to heat the premises during cold weather, the standby unit can be employed to generate heat and any excess AC power can be coupled back to the AC power grid. In many instances, the delivery of AC power back to the AC power grid can reduce the user's electricity bill from the utility, thereby providing an additional incentive to use the standby unit as often as possible.

In remote areas where electricity is not yet available, such as mountain cabins, lake houses, and the like, the availability of an AC power generator is more attractive especially when AC power can be individually provided to each house, and the thermal energy generated by the AC power unit can be used to heat the premises. In this instance, any excess AC power can be converted to DC and used to charge a bank of batteries for supplementary electrical energy for use by the user. The batteries, solar panels or wind generators can be used to generate hydrogen for use as a fuel for the engine that drives the generator. The hydrogen can be stored for use when needed by the engine.

From the foregoing, it can be seen a need exists for a standby AC power generator that is used more often to accommodate the various needs of the user and thereby make the unit more cost effective.

SUMMARY OF THE INVENTION

In accordance with the principles and concepts of the invention, there is disclosed a standby energy generating system that provides thermal energy as well as electrical energy to a premises, where the thermal energy constitutes the heat losses of the energy generating system itself.

In accordance with a feature of the invention, the energy generating system includes an internal combustion engine that uses a low cost fuel, such as natural gas or propane gas, to drive an AC generator. The heat given off by the engine, including the heat of the lubricating oil, and the coolant, is coupled to the premises to heat it during times when the outside temperature is cold.

In accordance with another feature of the invention, the electrical energy generated by the AC generator of the system either supplements the AC power connected to the premises by the utility company grid, or supplies all the AC power to the premises in the event there is an interruption in the AC power grid of the utility company.

In accordance with another aspect of the invention, the energy generation system can generate AC power not only to the premises but also for coupling the excess AC power back to the utility power grid and provide a cost saving to the owner of the premises.

In accordance with yet another feature of the invention, the standby energy generating system is controlled by a programmed processor coupled to many sensors in both the energy generating system as well as in the premises to control the amount and timing of the energy delivered to the premises to efficiently satisfy the needs thereof.

With regard to yet another feature of the invention, the heating/cooling thermostat of the premises can be connected to the processor so that when the premises requires heat, the processor controls the energy generating system to meet such needs. To that end, the processor can control the heating and air conditioning equipment of the premises and coordinate the operation thereof with the operation of the energy generating system.

According to another feature of the invention, the processor can monitor the AC power supplied by a utility company to the premises, and compare the AC power supplied by the utility company with a threshold. The processor controls the amount of supplemental torque supplied to an AC generator of the energy system so that additional torque can be brought on line to internally supply the requisite AC power and not exceed the threshold.

As a corollary to the foregoing, a DC motor or other torque-producing machine, can be brought on line to quickly supply the additional torque required by the AC generator to produce the amount of AC power that would otherwise exceed the threshold of AC power programmed into the processor. This feature is advantageous for users where a utility company charges consumers a higher rate for electrical usage that exceeds the threshold.

According to another feature of the invention, an AC generator can be coupled to multiple torque-producing components to supply the torque necessary in order for the AC generator to meet the AC power needs of the premises. The torque-producing components can include an internal combustion engine, AC motors, DC motors, etc. The torque-producing components can be brought on line by a programmed processor to drive the AC generator experiencing greater loads, as well as to drive other loads, such as pumps, battery chargers, etc. With this arrangement, the internal combustion engine can not only drive the AC generator but other equipment as well. During the operation of the engine to drive the AC generator, the heat produced by the engine is used to heat the premises.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

Figure 1:
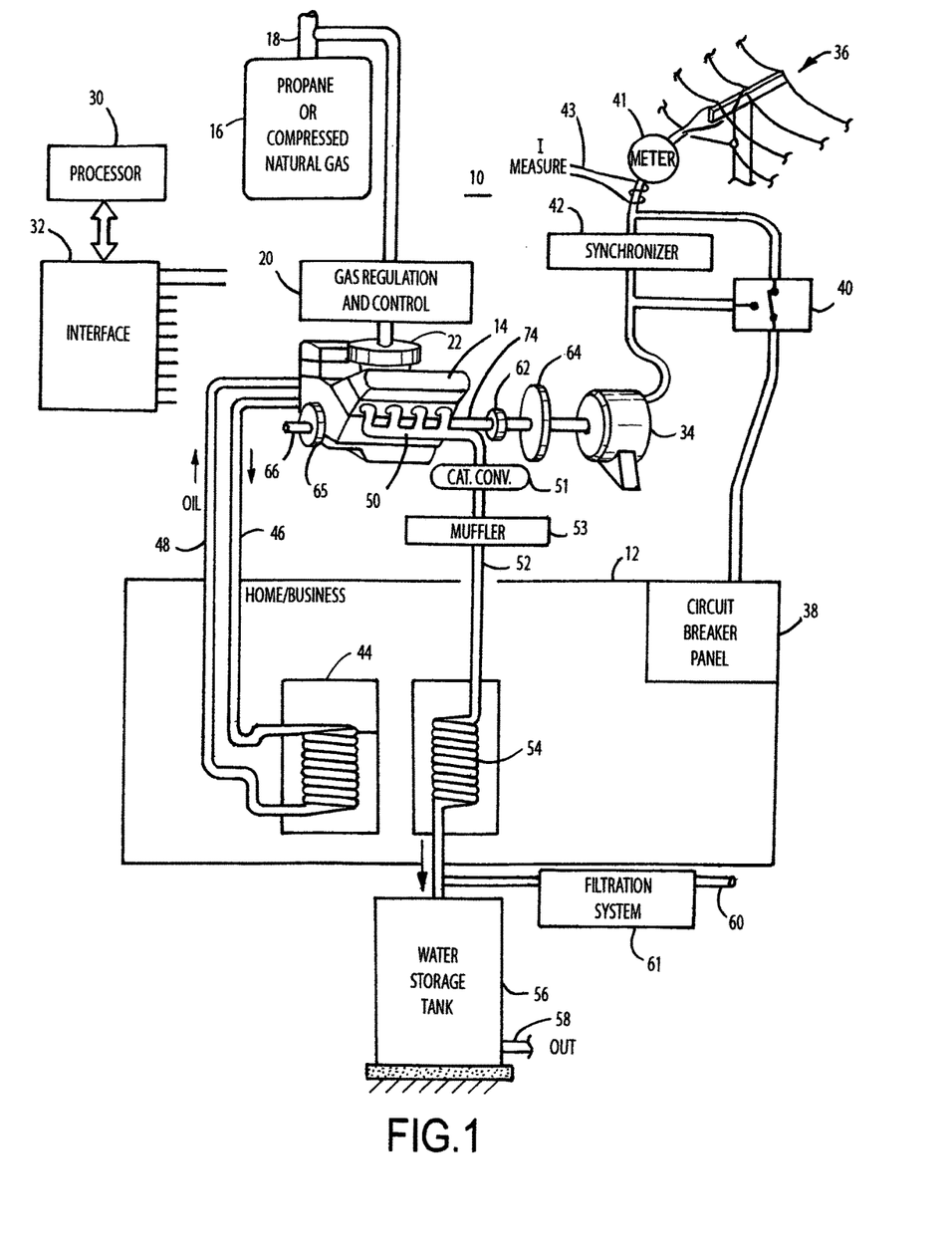
FIG. 1 is a diagram of an energy generating system for providing electricity and thermal energy for a premises.

With reference to FIG. 1, there is shown a standby energy generating system 10 that provides electricity and thermal energy to a building 12, such as a home, apartment, condominium, business, office, or any other structure that requires electricity and heat. The energy generating system 10 includes an internal combustion engine 14 of the type that uses a combustible fuel. The gas can be propane, natural gas, compressed natural gas or other suitable gas that can be combusted by an internal combustion engine 14. Other fuels can be used as well, such as gasoline, diesel, biofuel, alcohol, hydrogen, etc. A container 16 is employed to contain the gas, preferably in liquid form. If the gas is obtainable directly from an underground source, then such gas can be used directly from the well. The outlet 18 of the gas container 16 is coupled to a gas regulation and control unit 20, and then to the fuel delivery system 22 of the engine 14.

Figure 2:
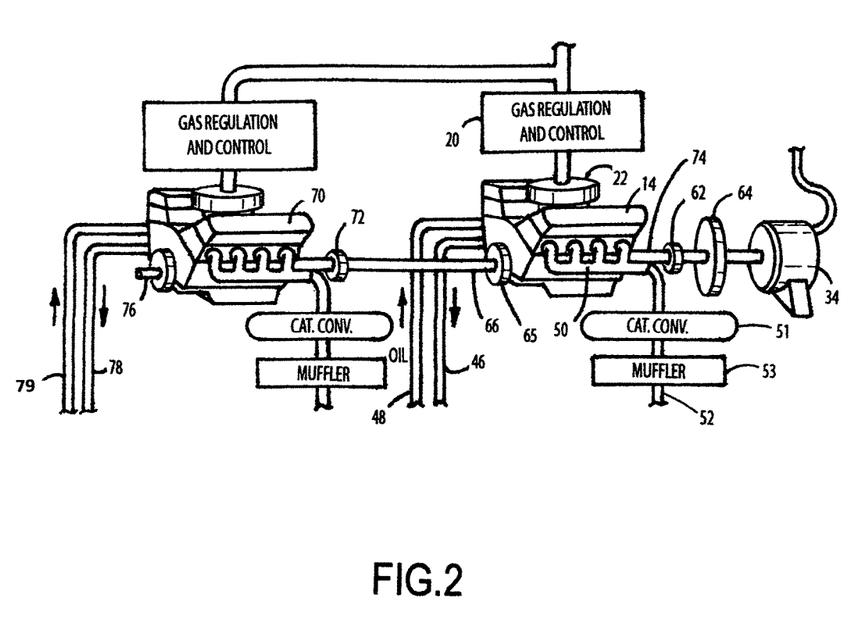
FIG. 2 illustrates an energy generation system utilizing multiple engines connected to a common drive shaft.

The engine 14 is illustrated as a single engine, but is it should be understood that multiple engines can be utilized, as illustrated in FIG. 2. The engines 14 and 70 can be connected to a common drive shaft 66 to produce additional power when two or more engines are running. Alternatively, a main engine 14 can be running and the auxiliary engine 70 can be placed by a clutch 72 in a standby condition. In order to optimize efficiency, one engine 70 can be smaller (in horsepower) than the other engine 14 to provide three different horsepower ranges. The smaller engine 70 can be used when low horsepower requirements are needed, the larger engine 14 can be used when medium horsepower requirements are needed, and both engines 14 and 70 can be placed on line when maximum horsepower requirements are needed. The engines 14 and 70 can also be coupled to the common drive shaft 66 by respective clutches 72 to couple and decouple the engines therefrom. The processor 30 not only controls the operation of the engines 14 and 70, but also controls the clutches depending on the power requirements of the home/business. As described herein, there may be times that both engines 14 and 70 can be operating even though the AC power requirements are low, to generate additional thermal energy for the home/business 12 or other equipment needing the same. The energy generation system 10 can include a second AC generator, or a DC generator, or other load that is connected to the crankshaft 76 of the auxiliary engine 70.

The engine 14 can also be constructed with the drive shaft or crankshaft 74 extending from opposite ends thereof to drive equipment located on both sides of the engine 14. As illustrated in FIG. 1, the engine 14 has a crankshaft 74 extending from the right side thereof (as viewed in the drawing) to drive a flywheel 64 and an AC generator 34 via a clutch 62. The crankshaft 66 on the left side of the engine 14 is connected to a clutch 65 for driving other equipment, such as an auxiliary pump, displacement pump, reverse osmosis pump, an AC or DC generator, another engine, or other mechanical load. The auxiliary load can be connected to the drive shaft located between the clutches 65 and 72 so that either engine 14 or 70 can drive the auxiliary equipment. As can be seen, a common drive shaft drives numerous loads located on both sides of the engine 14. The loads can be connected to the common shaft directly, or through a direct drive mechanism, so that if any piece of equipment becomes defective, it can be lifted out of place and replaced by a stub shaft, without disconnecting any of the other loads connected to the shaft. This eliminates the need to disconnect other loads in order to remove the defective load component.

The engine 14 can be utilized for purposes other than generating electricity via the generator 34. The generator 34 can be disconnected from the engine 14 via the engagement of the clutch 62. In this state, the engine 14 can be used to drive loads connected to the shaft 66, such as a reverse osmosis pump. Since the engine directly drives the osmosis pump, there is no need to use electricity to drive a motor to drive the reverse osmosis pump. Alternatively, the engine 14 can drive both an osmosis pump as well as the generator 34, whereupon the excess AC power can be delivered back to the AC power grid 36. In this latter event, the user or owner of the engine/generator unit may receive a credit from the utility company for such AC power.

The energy generation system 10 is controlled by a programmed processor 30 that is connected to an interface 32. The interface 32 includes an I/O that is connected to various components of the system 10, and the components of the home/business 12. For example, the interface 32 is connected to the gas regulation and control unit 20 to maintain the proper fuel/air mixture ratio for proper operation of the engine 14. The processor 30 is programmed to control the RPM of the engine 14 to maintain the desired frequency of AC power generated by the AC generator 34. The processor 30 is adapted to separately control the operating conditions of the auxiliary engine 70. Moreover, the interface 32 of the processor 30 monitors the AC power delivered by the utility power grid 36 to the circuit breaker panel 38 of the home/business 12. When the processor 30 senses that the AC power from the utility power grid 36 has been interrupted, then if the engine 14 is not already operating, it is caused to start and drive the generator 34 to provide supplemental AC power to the home/business 12. To that end, the processor 30 controls an AC switch 40 to determine if the home/business 12 is to receive AC power from the grid 36 or from the engine-driven AC generator 34. In addition, the programmed processor 30 is connected via the interface 32 to a number of sensors of the energy generating system 10 to monitor the proper operation thereof, as described below.

In accordance with an important feature of the invention, the thermal energy generated by the engine 14 is collected and coupled to the home/business 12 to heat it during times in which heat is needed. This can be accomplished irrespective of whether the AC power generated by the generator 34 is delivering AC power to the home/business 12 or to the utility grid 36. The temperature of the home/business 12 can be monitored by the processor 30 and if the temperature is below a predetermined set point, then the thermal energy of the engine 14 can be switched to the home/business 12 to increase the temperature to the desired level. Importantly, even if the AC power grid is delivering AC power to the home/business 12, the engine 14 can be started to generate thermal energy for heating the home/business 12. The excess AC power generated by the AC generator 34 can be switched via the AC switch 40 and the synchronizer 42 back to the utility power grid 36. An AC switch can be utilized so that the main engine generator 34 or the auxiliary engine generator, or both, can deliver AC power to the utility grid 36. When the engines 14 and 70 are connected to a common drive shaft 66, both AC generators will be driven at the same frequency. The clutch 72 can be slipped so that the generator driven by the auxiliary engine 70 is in phase with the generator 34 driven by the main engine 14. Once the generators are in phase, the clutch 72 is fully engaged to maintain the in-phase relationship between the two generators. The processor 30 can monitor the phases of both of the AC generators and adjust the mechanical drive therebetween to achieve a synchronization and maintain the same between the phases of the generators. It can be appreciated that in the event that the main engine 14 fails, or the main generator 34 fails, the auxiliary engine 70 and the auxiliary generator connected thereto via the crankshaft 76 can supply AC power to the home/office 12, or to the utility grid 36 via the synchronizer 42.

The synchronizer 42 is of conventional construction for synchronizing the phases of the power generated by the AC generator 34 with the phases of the AC power delivered by the utility power grid 36. When electrical power is generated by a DC source, such as a DC motor, a bank of batteries, or solar panels, the DC power can be converted into AC power by a grid tie inverter (not shown) and then coupled to the synchronizer 42.

The delivery of excess AC power from the standby generator 34 to the utility power grid 36 can decrease the monthly bills from the utility company. A power meter 41 can be monitored by the processor 30 to determine the direction and magnitude of power delivered between the utility power grid 36 and the home/business 12. If the generator 34 is capable of producing more AC power than is consumed by the home/business 12, then the remainder of the generated AC current will flow into the utility power grid 36. This means that the monthly AC power invoice from the utility power company will be less. This is known as "net metering," and can be extremely advantageous when the cost of the fuel 16 and other costs of the standby AC power generator is less than the cost per KW hour charged by the utility power company. It is noted that there is no additional cost to the home/business 12 for generating thermal energy when such system 12 is generating AC power for use by the home/business 12. In this instance, the system 10 generates thermal energy as a function of the load placed on the engine 14, and the RPM of the engine. The processor 30 controls the operating parameters of the engine 14 to assure that whatever load there is on such engine 14, it maintains the proper RPM to rotate the AC generator 34 accordingly to maintain the desired frequency of AC power developed. In certain instances, if more thermal energy is required to be delivered by the system 10, then the engine RPM can be increased and coupled through a transmission, or other variable in/out RPM mechanism, to the AC generator 34 to maintain a given input RPM to such generator. The AC current delivered to or from the utility grid is measured by the current sensing mechanism 43. The AC current delivered from the grid 36 to the home/business 12, and the AC current delivered to the grid 36 by the generator 34 can be measured and analyzed by the processor 30.

A processor-controlled AC switch 40 controls whether the home/business 12 receives AC power from the utility grid 36 or from the AC generator 34. In practice, the AC switch 40 is multi-pole to accommodate the different phases of the AC power. When the AC switch 40 is in the state shown, then AC power is delivered from the utility power grid 36 to the home/business 12. In this state, excess AC power from the generator 34 can still flow into the power grid 36 to reduce the monthly amount of AC power invoiced to the home/business 12 by the utility power company. The AC switch 40 is switched to the other state when there is a loss of power from the utility grid 36. The processor 30 monitors the various parameters of the AC power delivered by the utility power grid 36, and when it is determined that the utility power grid 36 has failed, the source of AC power is switched by the switch 40 so that the AC generator 34 then supplies AC power to the home/business 12. The synchronizer 42 senses that the grid power has failed and then effectively disconnects itself from the utility grid 36. In this state, the AC generator 34 cannot supply power back to the utility grid 36, as this could cause a potentially dangerous situation to any worker attempting to repair the faulty AC grid 36.

As an alternative to the use of AC power from the generator 34, the AC power can be converted to DC power to drive a hydrogen generator. The DC power generated can be coupled to two probes submersed in water so that one probe generates hydrogen and the other probe generates oxygen. The generation of hydrogen and oxygen is collected in different compartments above the water so that the two gases are maintained separate. The hydrogen can be collected and pressurized in a container as a supplemental fuel for the engine 14. Accordingly, the engine 14 can be the source of thermal energy to heat the home/business 12 or other object, while at the same time generating hydrogen fuel for storage and subsequent use by the engine 14. In order to provide a sufficient supply of hydrogen for fueling the engine 14, one or more hydrogen generators can be provided with DC current supplied by solar energy means or wind turbines.

The AC power generated by the generator 34 can also be converted to DC to charge batteries for storage of electrical energy. The DC power can also be used to charge batteries of one or more battery-operated vehicles. For example, during the day at a business building, or other business or at home, there can be DC receptacles in the parking lot or garage to allow the car owners to connect the vehicle batteries thereto to charge them. Then, when the work day is over, the battery-operated vehicles are fully charged and are ready to travel to another destination.

The internal combustion engine 14 can be of a number of cylinders to provide the horsepower necessary to drive the generator 34 and deliver the rated AC power, even during surge conditions. The engine 14 can be a V8 engine of the type which can be mechanically switched between four-cylinder operation or eight-cylinder operation. Generally, the engine 14 will be six or eight cylinders to deliver the necessary horsepower, but can include other numbers of cylinders. In addition, the internal combustion engine 14 need not be of the reciprocating type, but can be of the rotary or other type of internal combustion engine, and even a turbine engine that burns jet fuel or other type of fuel. Nevertheless, the engine 14 requires a lubricating oil that is circulated therethrough to provide lubrication to the moving parts. During operation of the engine 14, the lubricating oil becomes heated due to the combustion of the fuel in the cylinders and the friction of the bearings. The oil absorbs heat from the engine 14, and the oil is circulated through a finned heat exchanger 44 via insulated supply tubing 46 and return tubing 48. The heat exchanger 44 is located in the home/business 12, and when air is blown through the heat exchanger 44, the ambient air around the heat exchanger 44 is heated to thereby deliver hot air to the home/business 12. It should be noted that the thermal energy dissipated from the oil in the home/business 12 cools the lubricating oil, thereby increasing the life of the engine 14. The temperature of the lubricating oil delivered to the home/business can be up to 200-300 degrees F. The heat exchanger 44 can be surrounded with a liquid or air so that the thermal energy is transferred from the engine oil to the liquid or air. The liquid can be water to be heated in the home/business 12, such as for hot water faucets, shower, dish washer, etc. Air can be passed around the heat exchanger 44 and used to heat the environment of the home/business 12. Indeed, the heat exchanger 44 can be two coils, one for air and the other for water. Moreover, the two coils can be either in series or in parallel, depending on the need for different temperatures of the air/water (series), or the same temperatures (parallel). One coil can be inside the other coil, or other configurations can be utilized. As can be appreciated, the auxiliary engine 70 can be equipped with appropriate tubing 78 and 79 that can be switched so as to provide the thermal energy via the lubricating oil to the heat exchanger 44.

While not shown, a diverter valve can be placed in the oil lines 46 and 48 to control the amount of oil that is circulated through the heat exchanger 44. The processor 30 can monitor the ambient temperature of the home/business 12 and as the temperature approaches the set point, the diverter can be controlled to supply less heated oil to the heat exchanger 44. The programmed processor 30 can also be connected to the central heating/cooling system of the home/business so that it is turned off or down by the processor 30 when thermal energy is being provided by the engine 14. In other words, when it is more cost effective to generate thermal energy with the engine 14, there is no need to use the AC power from the utility grid 36 to generate heat. To that end, the processor 30 can be updated with data relating to the current cost of the fuel being used versus the cost of each KW hour of energy delivered by the utility power grid. When the efficiency favors the use of the engine 14, then the engine 14 is operated to deliver more thermal energy, and the electric furnace of the home/business 12 is controlled to reduce or curtail the generation of heat. This can be achieved by connecting two thermostat wires from the interface 32 to the electrical furnace so that the processor 30 controls the electrical furnace rather than the home/business thermostat controlling the furnace.

An additional source of thermal energy generated by the engine 14 is that of the exhaust. The combusted gases generated by the engine 14 are exhaust via a liquid cooled manifold 50, such as used on many inboard boat engines. In such type of marine-use manifolds, a jacket encloses the manifold, and a liquid is circulated between the jacket and the manifold to cool the manifold. The thermal energy transferred from the exhaust gasses to the liquid surrounding the manifold can be transferred to the home/business 12 for heating thereof. Rather than being exhaust to the atmosphere, the exhaust gases are collected from the manifolds 50 and processed through one or more catalytic converters 51 and mufflers 53, and then coupled via insulated tubing 52 to a second heat exchanger 54 that is located in the home/business 12. The exhaust gases from the engine 14 can reach temperatures up to about 700 degrees C., thereby delivering substantial thermal energy to the home/business 12. Air is blown over the heat exchanger 54 by a fan (not shown) to deliver heated air to the home/business 12. Because of the cooling of the exhaust gases in the heat exchanger 54, condensation can occur. The condensed liquid from the heat exchanger 54 can be collected in a tank 56 and then emptied periodically via a valve (not shown) connected to the outlet 58. The liquid will most often be condensed water, which can be filtered and reclaimed for later use. A water and vapor separator or trap (not shown) can be utilized to remove the water vapor from the exhaust gases before being exhausted to a filtration system 61. The exhaust gases exiting the heat exchanger 54 are cooler and can be processed through the filtration system 61, which can include charcoal or another medium to cleanse the exhaust gasses of undesirable agents. Once the exhaust gases have been cooled by being processed through the heat exchanger 54, the exhaust gasses entering the filtration system 61 can be as low as about 100 degrees F. The low temperature exhaust gases thus do not adversely affect any subsequent charcoal or other filtration medium. The emissions from the engine 14 thus have the potential for placing substantially zero pollutants into the environment. The feature of cooling the engine exhaust, or other hazardous vapors or fumes, to reduce pollutants can also be employed in the automobile industry and other applications using turbines. The cooled and clean exhaust gasses can be coupled to an exhaust pipe 60 and then to the atmosphere. The thermal energy from the exhaust gasses of the auxiliary engine 70 can be coupled to the heat exchanger 54 in a similar manner, and separately controlled by the processor 30.

The fan or fans that blow air across the heat exchangers 44 and 54 can be variable speed to control the amount of heat delivered to the home/business 12. The speed of the fan(s) can be controlled by the processor 30 as a function of the rate of temperature change desired to reach the set point temperature. In the event that the thermal energy delivered by both the heated oil and the exhaust is more than needed, the processor 30 can slow down the fan blowing air through the exhaust heat exchanger 54 and allow the thermal energy of the heated oil to be used to heat the home/business 12. This preference is thus to reduce the temperature of the oil and extend the life of the engine 14, and allow the thermal energy of the exhaust gases to pass to the atmosphere without substantial heat being withdrawn therefrom by the heat exchanger 54.

While not shown, the engine 14 and generator 34 can be placed together in an insulated enclosure to capture the heat radiated from such equipment. The enclosure can be equipped with one or more fans to blow the heat radiated from the engine 14 and generator 34 through an insulated duct to the home/business 12. The fan(s) can either force air through the engine compartment, or draw air from the engine compartment, or both. With this arrangement, a further amount of heat is used and not lost to the atmosphere. Again, the insulated duct can be connected to the engine enclosure by a diverter so that when the radiated heat is not to be coupled to the home/business 12, it is diverted to the atmosphere. The diverter would be controlled by the processor 30 as a function of the outside temperature and the temperature inside the home/business 12. The fans that blow the radiated heat from the engine 14 and generator 34 to either the home/business 12 or the atmosphere increases the life of such equipment. It can be appreciated that the engine 14 itself produces substantial heat from the metal engine block, the exhaust manifolds and exhaust pipes. In generating AC power, the generator 34 also produces heat. In addition, an engine radiator circulates a coolant through the engine block and dissipates heat from the coolant. The heat dissipated from the engine radiator constitutes thermal energy available for use in the home/business 12. The fan(s) that blow the heat from the enclosure can also blow the air through the engine radiator. Again, the auxiliary engine 70 and generator, or other equipment, can be enclosed in an insulated cabinet to contain the heat and circulate the same to the home/business 12. Alternatively, both engine/generator sets can be enclosed in a common enclosure.

FIG. 1 illustrates the engine 14 coupled to the generator 34 with an electrically-operated magnetic clutch 62. The clutch 62 is controlled by the processor 30. The clutch 62 is disengaged when it is desired to generate AC power by the generator 34. At times it may be desired to only generate thermal energy by the engine 14, whereupon the clutch 62 is engaged and the generator 34 is disconnected from the engine 14. When the generator 34 is disconnected from the engine 14, the heat generated by the engine 14 itself and associated components is coupled to the home/business 12. During start up of the system 10, the clutch 62 can be pulsed on and off so that the load on the engine 14 is brought up smoothly, rather than applying the load instantly to the engine. The initial pulsed operation of the clutch 62 allows the engine 14 to bring both the flywheel 64 and the generator 34 up to operating speed without applying an initial heavy load to the engine. The clutch 62 can be pulsed a specified number of times per second, such as ten times a second, until the load is running at the desired speed. The number of pulses can be changed per unit of time, and/or the width of the pulses can be changed. Once the flywheel 64 and the AC generator 34 are operating at the desired RPM, the clutch 62 is maintained disengaged so that the load is constantly connected to the engine 14. During shutdown of the system 10, the clutch can be engaged to disconnect the load from the engine 14 to prevent the flywheel 64 and the generator 34 from driving the engine 14. When disconnected, the flywheel 64 and the generator 34 can freewheel and slow down until rotation is stopped, independent of the engine speed.

In the illustrated embodiment, the flywheel 64 is connected to the engine 14 via the clutch 64. The auxiliary engine 70 can be equipped with a flywheel also. The flywheel 64 of the main engine 14 provides kinetic energy for assisting the engine 14 during periods when the generator 34 experiences surges due to sudden electrical loads of the home/business 12, such as air conditioners turning on, and the like. The mass and diameter of the flywheel 64 determines the size of the electrical surge that can be absorbed by the system without experiencing a drop in the AC voltage. The mass of the spinning flywheel 64 provides a specified number of Joules of energy that can handle a similar number of Joules represented by the electrical surge. It should be appreciated that the mass of the rotor of the generator 34 also functions as a flywheel for sustaining load surges. The system can also be equipped with AC capacitors located at the output of the AC generator to provide load current during surges. These three different capabilities to sustain AC power during surges is sufficient to overcome the same until the processor 30 can cause the engine 14 to increase power to drive the generator 34 during the remainder of longer surges. While not shown, the flywheel 64 rotates in and is supported by bearings. During starting of the engine 14, the clutch 62 can be engaged by the processor 30 so that the load of the flywheel 64 and the generator 34 is removed from the engine 14. After the engine 14 is operating at its preselected parameters, as determined by the processor 30, the clutch 62 can be disengaged to couple the flywheel 64 and the generator 34 to the engine 14. It can be appreciated that the processor 30 can be programmed to monitor various engine sensors to determine the performance of the engine 14, such as RPM, water and oil temperature, pollutants generated, fuel mixture, timing, etc.

The engine 14 can be coupled to the generator 34 by way of a transmission, not shown. By using a transmission that provides different ratios of rotation, the generator 34 can be driven at a given RPM, while the engine 14 is operating at different RPMs. There may be times when it is desired to generate more thermal energy with the engine 14, while driving the generator 34 at the same speed. In this instance, the RPM of the engine 14 can be increased under control of the processor 30 to increase the thermal energy generated by the engine 14, and the transmission can be adjusted or shifted by the processor 30 so that the generator 34 continues to be driven at the same RPM and thus deliver the same frequency of AC power. The transmission also can be connected between the flywheel 64 and the generator 34 so that the flywheel 64 rotates at the same speed as the engine 14 when the RPM is increased, thus providing more Joules of energy for surges. If the transmission is connected between the clutch 62 and the flywheel 64, then the flywheel 64 will rotate at the same speed as the AC generator 34. A gear-type transmission or a hydrostatic type of transmission can be utilized to change the ratio of input/output speed. Alternatively, a variable diameter V-belt pulley can be utilized to change the input/output speed. Many other types of transmissions can be utilized to provide a given output RPM with different input RPMs.

As noted above, the engine 14 and related energy generating components can be enclosed in a compartment that is insulated to prevent thermal energy from escaping to the environment. An inlet insulated duct connects the inlet of the compartment to the home/business 12 for circulating air from the home/business 12 to the engine compartment. An outlet insulated duct connects the outlet of the compartment to the home/business 12 to deliver heated air to the home/business 12. A circulation fan circulates the air in a closed loop system between the engine compartment to the home/business 12. In this manner, the heat lost by the engine 14 and associated components is captured and used as a heat source in the home/business 12. The air can be filtered before it enters either the compartment and/or the home/business 12. The processor 30 can control the amount of air circulated in the closed loop system by dampers, variable speed fans, and the like. A fresh air damper can be controlled to allow a predefined amount of fresh air to enter the closed loop system. The fan that circulates the air in the closed loop system is driven by the generator 34 and can be of the type that functions as a white noise generator to effectively cancel the noise of the engine 14 so that the net noise of the system 10 is reduced. The rotational speed of the fan as well as the shape and number of fan blades can be selected, as well as other parameters, to achieve the reduction of noise.

Figure 3A:
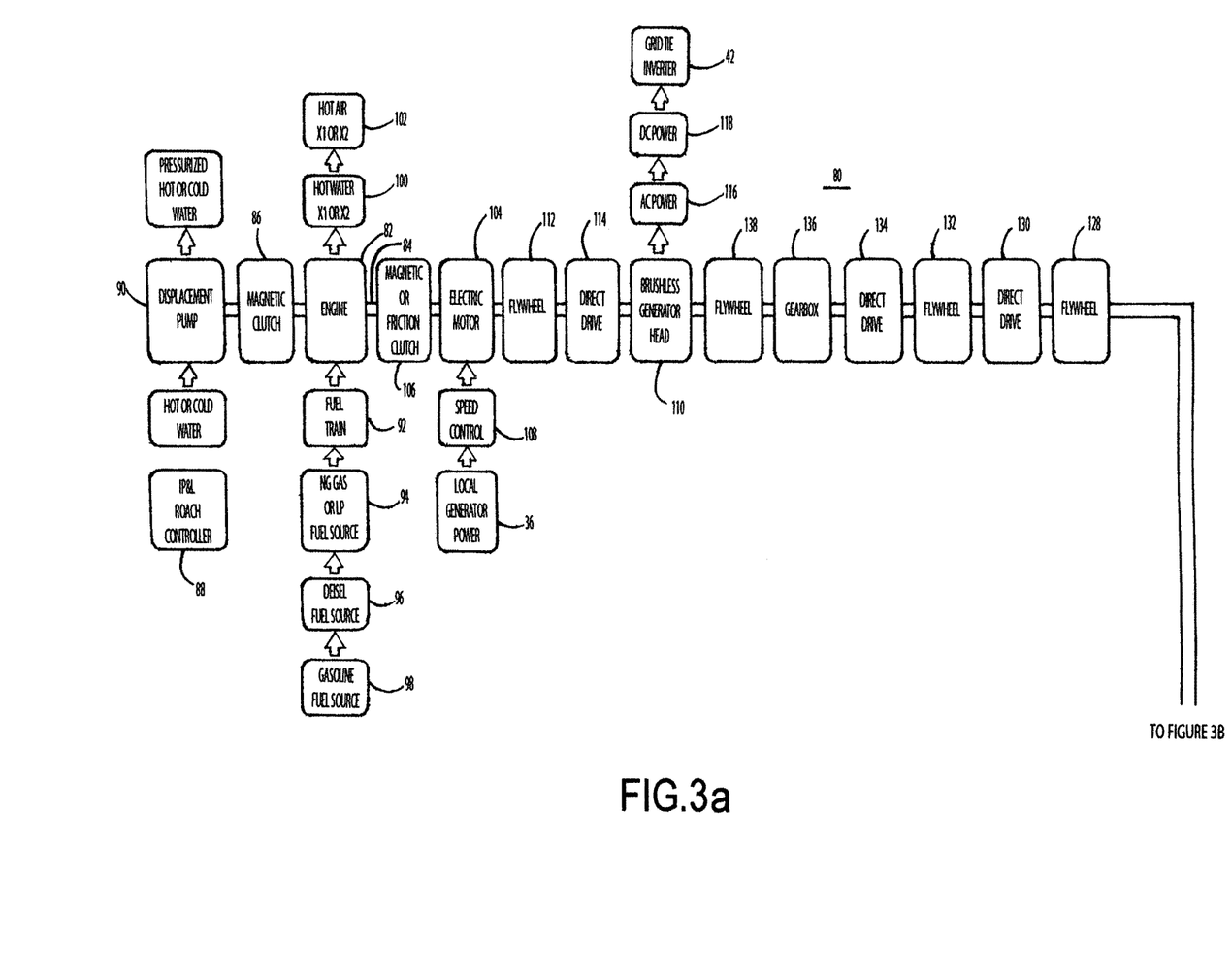
FIGS. 3a and 3b, when placed together, illustrate an energy generation system according to another embodiment, where a number of components can be connected either directly or indirectly via clutches to one or more engines and motors.
Figure 3B:
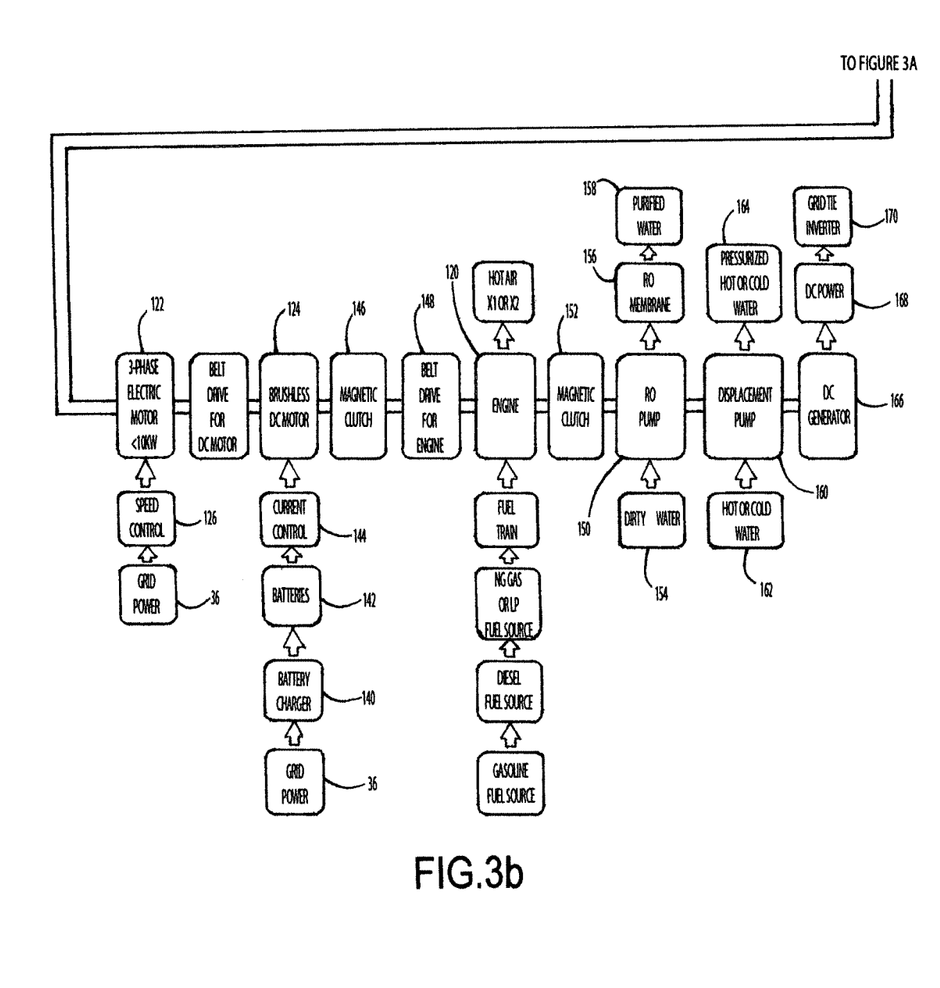

FIGS. 3a and 3b constitute a block diagram illustrating the components of an energy generation system 80. It should be understood that not all of the components of the energy generation system 80 would be used in a single practical application. Rather, the use of the various components of the system 80 would depend on the specific application. Here, an engine 82 is connected to a drive shaft 84 that is connected to a number of other components that require rotary power to drive them. The common drive shaft is shown connected between the numerous components, to be described below. The drive shaft connected to the left of the engine 82 (as seen in the drawing), is connected to a magnetic clutch 86 controlled by a controller 88. It can be appreciated that the controller 88 can control or monitor each of the components and appropriate sensors via an interface well known in the art. The engine 82 drives a displacement pump 90, via the magnetic clutch 86, where the displacement pump 90 pressurizes either hot or cold water.

The engine 82 includes a fuel train 92 that preconditions and otherwise controls the amount of fuel to be delivered to the engine 82, and thus the engine speed, emissions and/or torque. The fuel train 92 is preferably controlled by the controller 88. The engine 82 can be of different types that employ different types of fuels, including natural gas or liquid petroleum 94, diesel 96 or gasoline 98. Hydrogen can also be used as a fuel for the engine 82. Much like the energy generation system 10 described above, the engine 82 produces hot water 100 and hot air 102 as a natural consequence of operation of an internal combustion engine.

The engine 82 is connected to an electric motor 104 via a magnetic or friction clutch 106. When the electric motor 104 is idled or otherwise in a standby state, the engine 82 simply drives the flywheel 112 and the AC generator 110 through the rotor shaft of the electric motor 104. The electric motor 104 can be placed into operation to supplement the torque applied to the AC generator 110 in order to minimize or reduce the utility-supplied AC power delivered to the home/business 12. In some jurisdictions, a utility power company will assess a specified cost/KWH until the power usage increases above a predetermined threshold, and after the threshold is exceeded, even during a single surge condition, the cost/KWH will be increased for the remainder of the billing period. Thus, if a single surge of AC power exceeds the threshold, then the home/business 12 will be assessed an increased cost for the remainder of the billing period even if the threshold is exceeded only once during the billing period. This billing technique is often known as a "demand charge."

In those situations where there is a demand charge assessed by the utility 36, the electric motor 104 can be controlled by the controller 88 so as to be energized when the AC power usage by the home/business 12 is nearing the AC power threshold. The AC power threshold can be either manually or automatically programmed into the controller 88, and updated when it changes. The electric motor 104 assists the engine 82 in delivering the additional torque needed by the AC generator 110 to deliver AC power to the increased load. The controller 88 is programmed to take into consideration the AC power used by the electric motor 104 so that the use of the electric motor 104 does not itself cause the threshold to be exceeded. As an alternative, the electrical power that drives the electric motor 104 can be from a bank of batteries and inverter, where the inverter uses the DC power as an input and delivers AC power to the motor 104. As a further alternative, the electric motor 104 can be a DC motor driven from a DC source, such as a bank of batteries. It is noted that the initial surge of the electrical load on the AC generator 110 can be handled by the flywheel 112, AC capacitors, or the like. The sustained increase in the load presented to the AC generator 110 can be handled by the electric motor 104.

The supplemental source of torque could also be the DC motor and another flywheel to further assist the engine 82, or operate in lieu of the engine 82. When the DC motor or other supplemental source of torque is off line, and when the AC power threshold is being approached, the DC motor can bring the flywheel up to speed and be ready to be placed on line to provide supplemental torque to the AC generator 110. In any event, the supplemental source of torque is of the type that can be placed on line quickly to provide sustained torque to supplement that produced by the engine 82, without interrupting AC power to the home/business 12, or temporarily exceeding the threshold. As a further alternative, the controller 88 can monitor and control the electrical switches or activation devices that apply AC power to respective loads called for by the home/business 12. When a new AC load is called for by the home/business 12, the controller 88 can place the new AC load into operation only after the supplemental torque has been placed on line and is ready to supply the additional torque that will be required by the AC generator 110. In other words, if an AC machine is to be placed into service when the operator pushes the "on" switch, the controller 88 will sense the same and will control the AC machine such that it will actually be turned on after the supplemental source of torque has been placed on line. Thus, there may be a short delay in turning on the AC machine after the operator activates the "on" switch. This feature of the invention can provide a substantial cost saving to the home/business 12.

The drive to the electric motor 104 is by way of the drive shaft 84 connected to the right side of the engine 82. The electric motor 104 is typically driven by the AC grid power 36, under control of a conventional speed control 108. The speed control 108 assures that the electric motor 104 drives the AC generator 110 at the proper RPM to generate the desired frequency. In this embodiment, the electrical motor 104 functions as an auxiliary source of power to drive an AC generator 110, when the engine 82 is either not operational, or to supplement the torque for driving the AC generator 110. In any event, either the engine 82 or the electric motor 104, or both, drive a flywheel 112 which in turn provides additional torque, albeit temporary, to the AC generator 110. The flywheel 112 provides torque to overcome surge loads presented to the AC generator 110 by its electrical load. The flywheel 112 is connected to the AC generator 110 by a direct drive mechanism 114. The direct drive mechanism 114 can be any means to mechanically connect the drive shafts together, and allow easy disconnection thereof without removal of adjacent components. The AC generator 110 delivers AC power 116 which is converted to DC power 118 and thus to the grid tie inverter and then to the synchronizer 42. In the grid tie inverter, the DC power is converted to AC power, and then the synchronizer combines the source of AC power in phase with that of the utility AC grid power. It should be appreciated that anywhere between the engine 82 and the AC generator 110, other apparatus can be employed to change the in/out speed to maintain a given speed of the AC generator 110. The variable speed change apparatus can be used to accommodate a component that has a special speed requirement. The variable speed change apparatus can also be employed in any point in the energy generation system 80 of FIGS. 3a and 3b.

In addition, or as an alternative to the drive provided by the engine 82, the AC generator 110 can also be driven by other torque-producing equipment, namely a three phase electric motor 122, a brushless DC motor 124 or a second engine 120. The three phase electric motor 122 is driven by the AC power grid 36 via a speed control 126. The speed control 126 assures that the AC generator 110 is driven at the proper speed to generate the desired frequency. The output shaft of the three phase electric motor 122 drives a flywheel 128, which is connected to a direct drive mechanism 130 which, in turn, is connected to a second flywheel 132. Similarly, the second flywheel 132 is connected to a gearbox 136 via a direct drive mechanism 134. The gear box 136 can be a transmission or a set of meshed gears, chain or belt drive, for suitably providing the desired input/output RPMs. The gear ratio can be selected to operate the engine 120 faster and generate more heat and power, but yet maintain the generator speed constant. The gear box 136 drives a third flywheel 138 which drives the AC generator 110. By using multiple flywheels, a substantial amount of kinetic energy is available to provide torque to the AC generator 110 during short periods of surge loads on the AC generator 110. As can be appreciated, the flywheels 128, 132 and 138 provide instantaneous torque to supplement the torque otherwise provided by engines, motors and the like.

The AC generator 110 can also be driven by the brushless motor 124. The DC motor 124 can be indirectly powered by the AC grid 36 which drives a battery charger 140. The battery charger 140 charges a bank of batteries 142. The current delivered by the bank of batteries 142 drives the DC motor 124 and controls the RPM thereof by way of a DC current control 144. When either the three-phase motor 122 or the DC motor 124 are on line to drive the AC generator 110, a magnetic clutch 146 can be engaged to disconnect the motors 122 and 124 from the second engine 120.

The second engine 120 can drive the AC generator 110 via a belt drive mechanism 148. The other intermediate components are freewheeled by the controller 88 when the second engine is placed on line to drive the AC generator 110. The second engine 120 can be of the type which can operate with a specific fuel of a variety of fuels. Again, when operating, the second engine 120 produces hot air and hot coolant which can be used to heat the home/business 12. As an alternative to driving the AC generator, the second engine 120 can apply torque to the crankshaft on the right side thereof to drive a reverse osmosis pump 150 via a magnetic clutch 152. The controller 88 can control both the operation of the second engine 120 as well as the operation of the magnetic clutch 152. The reverse osmosis pump 150 draws in dirty water 154 and forces the same through a membrane 156 to provide purified water 158. In addition to driving the reverse osmosis pump 150, the second engine 120 also drives a positive displacement pump 160 which draws in hot or cold water 162 to pressurize the same and provide hot or cold pressurized water 164 at its outlet. The input shaft of the displacement pump 160 is driven by the output shaft of the reverse osmosis pump 150. The output shaft of the displacement pump 160 drives a DC generator 166. The DC current output from the DC generator 166 is coupled via a DC power circuit 168 to a grid tie inverter 170 which converts the DC power to AC power in phase with that of the utility AC power grid 36. While not shown, the additional loads coupled to either or both engines 82 or 120 can include super chargers for the engines, a welder, air compressor, centrifugal water pump, a roots vacuum pump, chiller pump, or an air conditioning/refrigeration pump.

The hot exhaust gasses from the engines 82 or 120 can be used to heat one or more propane tanks to prevent freezing of the propane gas when withdrawing the gas from the tank. By heating the tank, the propane gas inside will be warmed and thus prevented from either freezing or reducing the vapor pressure thereof. The use of hot water or air from the engine, or other engine heat, can be utilized to warm the propane tank. The propane tank can be placed in a container of water, and the water is heated with the engine heat.

From the foregoing, disclosed are various embodiments of energy generation systems which provide both heat and electricity for use by a home/business, or any other premise that can utilize the same. A significant efficiency is achieved by employing an internal combustion engine that can provide both torque for driving loads, as well as provide thermal energy in various modes, including hot air, hot water and hot lubricants. The thermal energy can be recovered from the engine and transferred to the home/business in a controlled manner for heating the same. The internal combustion engine of the energy generating system can also drive an AC generator for providing AC power to the home/business. When an excess of AC power is generated by the energy generation system, such excess AC power can be coupled back to the utility AC grid. The cost of AC power from the grid can thus be reduced.

As used herein, the terms processor and controller are interchangeable. It should be appreciated that in view of the foregoing, the various components described, as well as others not identified but yet applicable to the invention, can be employed to enhance the flexibility of the energy generating system. Similarly, the components of certain embodiments disclosed can be used in other embodiments, and not all components associated with the respective embodiments are necessary to carry out the practical applications of the various embodiments. While described as a standby energy generating system, the system can be adapted for supplying the main energy needs of the premises.

While the preferred and other embodiments of the invention have been disclosed with reference to a specific standby energy generator, and associated methods of energy generation thereof, it is to be understood that many changes in detail may be made as a matter of engineering choices without departing from the spirit and scope of the invention, as defined by the appended claims.

What is claimed is:

1. An energy generating system for supplying energy to a premises, comprising:
    an internal combustion engine that generates torque and thermal energy;
    an electrical generator driven by the torque of said engine for generating electrical energy for the premises;
    means for coupling the thermal energy generated by said engine to the premises for heating thereof;
    a software programmed processor for controlling the energy generating system, said processor programmed to monitor an amount of electrical energy consumed by the premises, said processor programmed with a threshold of electrical energy above which an AC utility company charges the premises an increased cost of AC power delivered to the premises, said processor programmed to sense when said threshold is approached and in response thereto said processor controls the energy generating system to supply AC power from said electrical generator to supplement the AC power delivered from the AC utility company so that said threshold is not exceeded; and
    said programmed processor is updatable for programming therein a new threshold as a function of a requirement of the AC utility company.

2. The energy generating system of claim 1, wherein thermal energy is coupled to the premises from at least one of an engine exhaust, engine lubricating oil, engine coolant, engine block, and engine exhaust system.

3. The energy generating system of claim 1, further including a reverse osmosis pump driven by said engine, and including a filter membrane, said reverse osmosis pump pumps dirty water through said filter membrane to provide more pure water to the premises, whereby the premises is provided electrical energy and pure water at the same time.

4. The energy generating system of claim 1, further including equipment that includes at least one of a DC motor, a supplemental AC generator or a supplemental engine operatively connected to said electrical generator, whereby said processor controls said equipment to supplement torque to the rotor shaft of said electrical generator to enable said electrical generator to produce increased AC power to drive a greater electrical load of the premises so that said threshold is not exceeded.

5. The energy generating system of claim 1, further including a flywheel driven by said engine, said flywheel providing torque to sustain a speed of said generator during surge loads.

6. The energy generating system of claim 1, wherein said engine includes a crankshaft, and a first drive shaft connected to a front of said crankshaft, and a second drive shaft connected to a back of said crankshaft, wherein said first and second drive shafts can drive respective loads connected thereto.

7. The energy generating system of claim 1, wherein exhaust gasses generated by said engine are coupled to the premises and processed through a heat exchanger to provide hot air to the premises.

8. The energy generating system of claim 1, further including a hydrogen generator, and including a converter for converting AC power generated by said generator to DC current, and the DC current is used by said hydrogen generator for generating hydrogen.

9. The energy generating system of claim 8, further including a storage tank for storing the hydrogen generated by said hydrogen generator, and said engine uses the hydrogen from the storage tank as a fuel to operate said engine.

10. The energy generating system of claim 1, wherein said engine is equipped with a liquid jacket surrounding an exhaust manifold of said engine, and a liquid circulating through said jacket is heated by said engine and coupled to the premises.

11. The energy generating system of claim 1, wherein said engine includes a coolant system for maintaining said engine at a predefined temperature, a coolant circulating through the engine coolant system is circulated through the engine and coupled to the premises to heat the premises.

12. The energy generating system of claim 1, further including a heat exchanger through which exhaust gases from said engine are processed so that a temperature of the exhaust gases exiting said heat exchanger is reduced, and further including a gas purification filter to remove noxious pollutants from the gases exiting the heat exchanger, whereby gases pass from the purification filter and to the atmosphere with substantially reduced pollutants.

13. An energy generating system for supplying energy to a premises, comprising:
    an internal combustion engine that generates torque and thermal energy;
    an electrical generator driven by the torque of said engine for generating electrical energy for use by the premises;
    means for coupling the thermal energy generated by said engine to the premises for heating thereof;
    a premises heater separate from said internal combustion engine for heating the internal space of said premises, said premises heater using energy of one electrical or fossil fuel;
    a processor programmed to select one of said internal combustion engine or said premises heater for supplying thermal energy to the premises as a function of cost effectiveness, said processor for controlling operation of said energy generating system and operation of said premises heater;
    a sensor for sensing a temperature of the premises;
    said processor programmed to store a cost of fuel for said internal combustion engine and to store a cost of the energy used by said premises heater;

said processor sensing the temperature of the premises to determine when heat is to be supplied to the premises, and said processor carries out a calculation of the cost of the fuel for the internal combustion engine and a cost of the energy used by said premises heater; and said processor selects for delivery to the premises the thermal energy of the internal combustion engine or the thermal energy of said premises heater as a function of which source of thermal energy is more cost effective.

\* \* \* \* \*